United States Patent
Yu et al.

(10) Patent No.: US 10,870,170 B2
(45) Date of Patent: Dec. 22, 2020

(54) BEAM HOMOGENIZER FOR SURFACE MODIFICATION

(71) Applicant: HANDONG GLOBAL UNIVERSITY FOUNDATION, Pohang (KR)

(72) Inventors: Tae Jun Yu, Pohang (KR); Kyung Hee Hong, Pohang (KR); Tae Shin Kim, Pohang (KR); Seung Jin Hwang, Pohang (KR); Yoong Wook Sin, Pohang (KR)

(73) Assignee: HANDONG GLOBAL UNIVERSITY FOUNDATION, Pohang-si (KR)

( * ) Notice: Subject to any disclaimer, the term of this patent is extended or adjusted under 35 U.S.C. 154(b) by 113 days.

(21) Appl. No.: 16/074,765

(22) PCT Filed: Nov. 14, 2016

(86) PCT No.: PCT/KR2016/013062
§ 371 (c)(1),
(2) Date: Aug. 1, 2018

(87) PCT Pub. No.: WO2017/135552
PCT Pub. Date: Aug. 10, 2017

(65) Prior Publication Data
US 2019/0039179 A1    Feb. 7, 2019

(30) Foreign Application Priority Data
Feb. 2, 2016    (KR) .................. 10-2016-0012852

(51) Int. Cl.
*B23K 26/06*    (2014.01)
*H01S 3/00*    (2006.01)
(Continued)

(52) U.S. Cl.
CPC ...... *B23K 26/0648* (2013.01); *B23K 26/0006* (2013.01); *B23K 26/067* (2013.01);
(Continued)

(58) Field of Classification Search
CPC ................ B23K 26/0648; B23K 26/70; G02B 27/0927; H01S 3/005
See application file for complete search history.

(56) References Cited

FOREIGN PATENT DOCUMENTS

| | | |
|---|---|---|
| JP | 06-296053 A | 10/1994 |
| JP | 10-333077 A | 12/1998 |

(Continued)

*Primary Examiner* — Jack Dinh
(74) *Attorney, Agent, or Firm* — Patent Office of Dr. Chung Park (57) ABSTRACT

A beam homogenizer for surface modification comprises: a first lens array configured to split a laser beam, irradiated from a laser beam irradiation unit, into a plurality of beamlets; a second lens array configured to transmit the plurality of beamlets and comprising a plurality of lenslets corresponding to the first lens array; and a focusing lens configured to focus the plurality of beamlets, transmitted through the second lens array, onto a surface of a target. The beam homogenizer further comprises: a plasma generation-preventing unit disposed between the first and second lens arrays and configured to prevent plasma from being generated in the focal zone of the beamlets; or a damage-preventing unit disposed between the focusing lens and the target and configured to prevent the focusing lens from being damaged by energy generated when the plurality of beamlets is irradiated onto the target.

6 Claims, 8 Drawing Sheets

(51) Int. Cl.
*B23K 26/70*      (2014.01)
*G02B 27/09*      (2006.01)
*B23K 26/067*     (2006.01)
*B23K 26/142*     (2014.01)
*B23K 26/00*      (2014.01)
*B23K 26/12*      (2014.01)
*B23K 26/146*     (2014.01)
*B23K 26/14*      (2014.01)

(52) U.S. Cl.
CPC ...... *B23K 26/0652* (2013.01); *B23K 26/1224* (2015.10); *B23K 26/142* (2015.10); *B23K 26/146* (2015.10); *B23K 26/1476* (2013.01); *B23K 26/70* (2015.10); *B23K 26/702* (2015.10); *B23K 26/706* (2015.10); *G02B 27/0927* (2013.01); *H01S 3/005* (2013.01)

(56) References Cited

FOREIGN PATENT DOCUMENTS

| JP | 11-269683 A   | 10/1999 |
| JP | 2012-192420 A | 10/2012 |
| KR | 10-0890295 B1 | 3/2009  |

BEAM HOMOGENIZER FOR SURFACE MODIFICATION

CROSS-REFERENCE TO PRIOR APPLICATIONS

This application is a national Stage Patent Application of PCT International Patent Application No. PCT/KR2016/013062, filed on Nov. 14, 2016 under 35 U.S.C. § 371, which claims priority of Korean Patent Application No. 10-2016-0012852, filed on Feb. 2, 2016, which are all hereby incorporated by reference in their entirety.

TECHNICAL FIELD

The present invention relates to a beam homogenizer for surface modification, and more particularly to a beam homogenizer for surface modification, which is capable of solving problems caused by high energy in a process of irradiating a laser beam onto a target.

BACKGROUND ART

A beam homogenizer is widely used, which converts a beam having a non-uniform distribution, such as a common laser beam having a Gaussian distribution, into a beam having an approximately uniform distribution.

Figure 1:
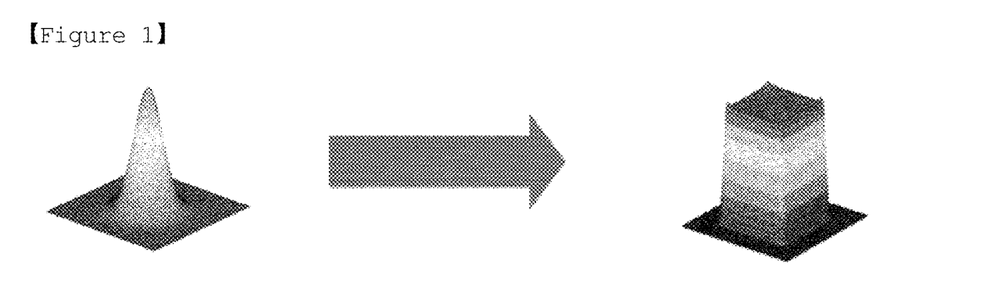
FIG. 1 shows each of the intensity distribution of a common laser beam and the intensity distribution of a laser beam homogenized by a beam homogenizer.

Referring to FIG. 1, the left side shows the intensity distribution of a common laser beam, and the right side shows the intensity distribution of a laser beam homogenized by a beam homogenizer.

As shown therein, since a common laser beam has an approximately Gaussian distribution which is not uniform, and thus it has a problem in that it is not suitable for use in target processing such as surface modification.

Thus, a beam homogenizer may be used to convert this laser beam into a laser beam having an approximately uniform distribution so that the laser beam can be used in various processes.

Figure 2:
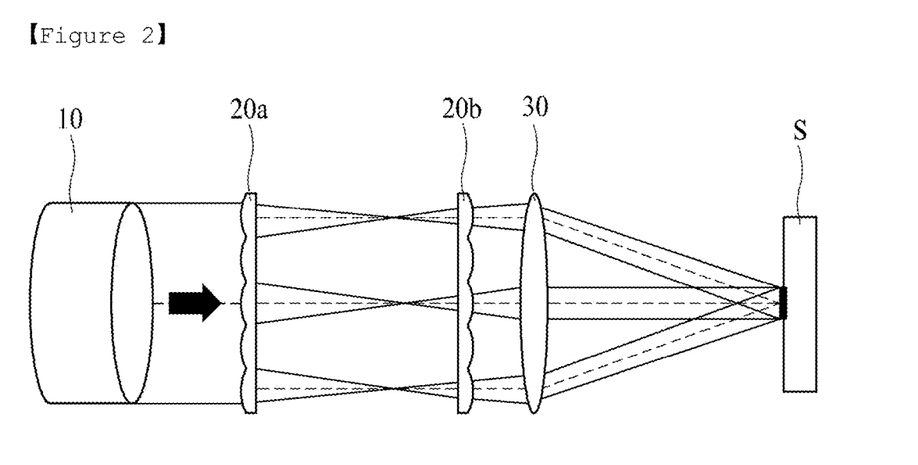
FIG. 2 shows each component of a beam homogenizer.

As shown in FIG. 2, the beam homogenizer comprises an optical unit configured to homogenize a laser beam irradiated from a laser beam irradiation unit 10. For example, the optical unit may include a plurality of lens arrays 20a and 20b configured to split an incident laser beam into a plurality of beamlets and to determine the shape, and an optical lens 30 configured to focus the beamlets, which passed through the lens arrays 20a and 20b, onto the surface of a target (S). In addition, the beamlets homogenized by the lens arrays 20a and 20b as described above may be irradiated onto the surface of the target in order to modify the surface.

However, regarding the above-described conventional process of homogenizing the beam, various problems have been reported.

Figure 3:
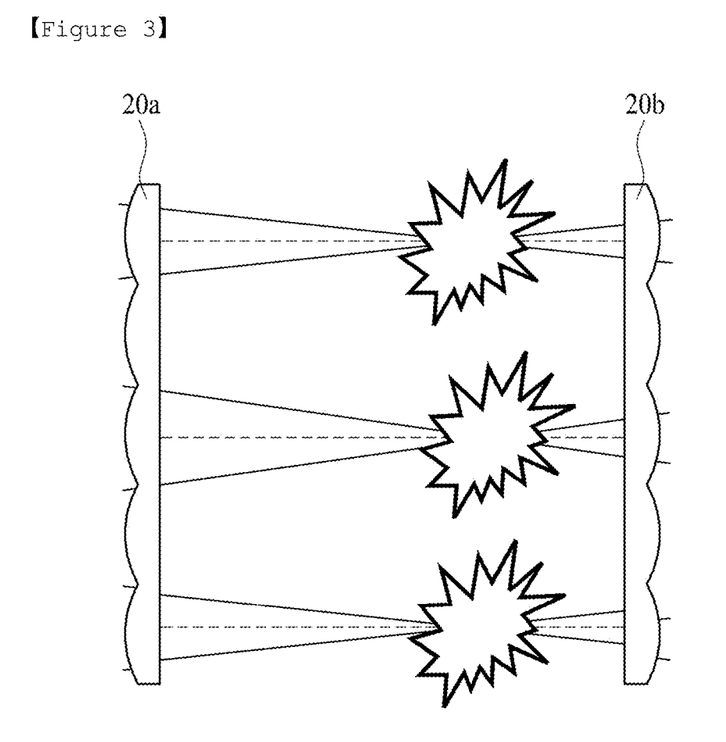
FIG. 3 shows that the air breakdown between lens arrays in a conventional beam homogenizer occurs.

Specifically, as shown in FIG. 3, the air breakdown between the lens arrays 20a and 20b may occur. This refers to a phenomenon in which plasma is generated because a large amount of energy is gathered in a small area when the laser beam is focused between the lens arrays 20a and 20b.

In this case, a problem arises in that, because the high energy of the laser beam turns air into plasma, the image of the laser beam is not properly transmitted, and thus a uniform beam having a desired intensity is not produced.

Figure 4:
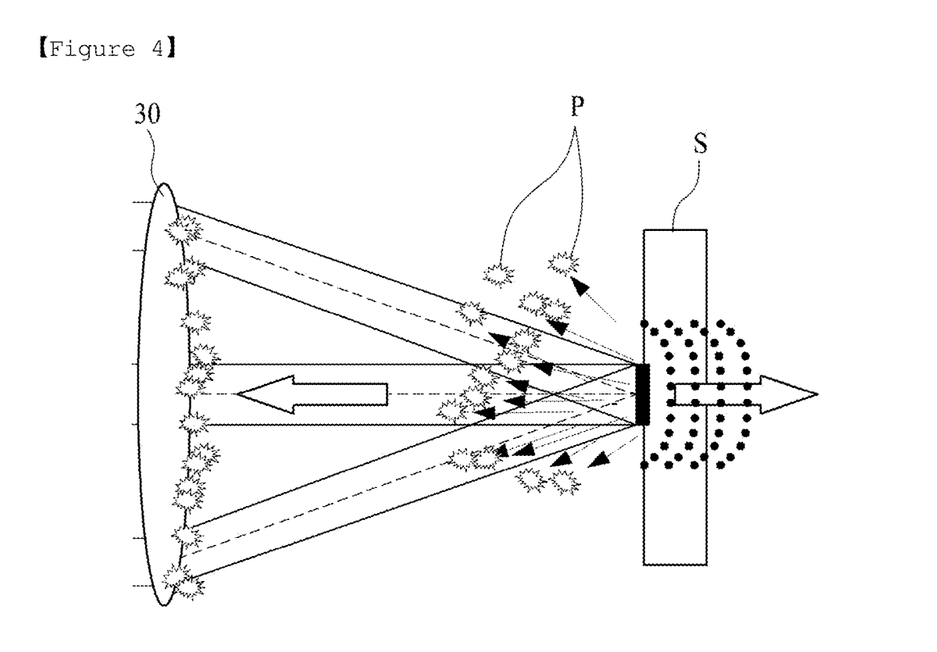
FIG. 4 shows that electrons, ions and target pieces scatter toward a focusing lens in response to shock waves caused by plasma generated when a laser beam in a conventional beam homogenizer is irradiated onto the surface of a target.

Regarding another problem, as shown in FIG. 4, shock waves caused by plasma generated when the laser beam is irradiated onto the surface of the target (S) penetrate the target, and at the same time, electrons and ions scatter in response to these shock waves and deteriorate or damage the coating of a focusing lens 30.

In particular, when metal pieces (P) scatter together with electrons and ions, a problem arises in that the focusing lens 30 is greatly damaged.

Therefore, a method for solving such problems is required.

DISCLOSURE

Technical Problem

The present invention has been made in order to solve the above-described problems occurring in the prior art, and it is an object of the present invention to a beam homogenizer for surface modification, which is capable of solving problems caused by high energy in a process of irradiating a laser beam onto a target.

Objects of the present invention are not limited to the above-mentioned objects, and other objects which are not mentioned will be clearly understood by those skilled in the art from the following description.

Technical Solution

To achieve the above object, the present invention provides a beam homogenizer for surface modification, comprising: a first lens array configured to split a laser beam, irradiated from a laser beam irradiation unit, into a plurality of beamlets, the first lens array comprising a plurality of lenslets configured to determine the shape of the laser beam; a second lens array configured to transmit the plurality of beamlets split by the first lens array, the second lens array comprising a plurality of lenslets corresponding to the first lens array; a focusing lens configured to focus the plurality of beamlets, transmitted through the second lens array, onto the surface of a target; and a plasma generation-preventing unit disposed between the first lens array and the second lens array and configured to prevent plasma from being generated in the focal zone of the beamlets.

The plasma generation-preventing unit may comprise a vacuum chamber disposed between the first lens array and the second lens array and having an internal space which is maintained in a vacuum atmosphere.

The plasma generation-preventing unit may also comprise a gas chamber formed to cover at least the focal zone of the beamlets and configured to receive a filling gas having a plasma generation threshold higher than that of air.

The gas chamber may comprise first frames disposed on both sides of each of the first lens array and the second lens array and configured to cover the space between the first lens array and the second lens array.

The gas chamber may also comprise second frames disposed in a direction parallel to the first lens array and the second lens array and configured to cover the space between the first lens array and the second lens array together with the first frames and also capable of transmitting the beam.

The filling gas may comprise at least one of helium and neon.

In another aspect, the present invention provides a beam homogenizer for surface modification, comprising: a first lens array configured to split a laser beam, irradiated from a laser beam irradiation unit, into a plurality of beamlets, the first lens array comprising a plurality of lenslets configured to determine the shape of the laser beam; a second lens array configured to transmit the plurality of beamlets split by the first lens array, the second lens array comprising a plurality of lenslets corresponding to the first lens array; a focusing lens configured to focus the plurality of beamlets, transmitted through the second lens array, onto the surface of a target; and a damage-preventing unit disposed between the focusing lens and the target and configured to prevent the focusing lens from being damaged by energy generated when the plurality of beamlets is irradiated onto the target.

The damage-preventing unit may comprise a housing disposed in the irradiation path of the beamlets and having formed therein a receiving space configured to receive water.

The housing may be formed to be inclined such that the sectional area thereof decreases gradually from the focusing lens toward the target.

The damage-preventing unit may comprise: an inlet disposed at the front end of the housing and configure to introduce water into the receiving space; and an outlet disposed at the rear end of the housing and configured to discharge water from the receiving space, and water in the receiving space may flow from the inlet to the outlet.

The diameter of the front end of the housing and the diameter of the read end of the housing may be determined within a range in which the flow of water in the receiving space forms laminar flow.

Advantageous Effects

The beam homogenizer for surface modification according to the present invention to achieve the above-described objects has the following effects.

First, it has an advantage in that it prevent air breakdown from being caused by high-energy concentration between the lens arrays. Thus, it can produce a uniform beam with a desired intensity by accurately transmitting the image of a laser beam.

Second, it has an advantage in that it can prevent the focusing lens from being deteriorated or damaged by electrons, ions and target pieces, which are generated due to shock waves caused by plasma generated when the laser beam is irradiated onto the surface of the target.

Effects of the present invention are not limited to the above-mentioned effects, and other effects which are not mentioned can be clearly understood from the appended claims.

MODE FOR INVENTION

Hereinafter, exemplary embodiments of the present invention, which can achieve the objects of the present invention, will be described in detail with reference to the accompanying drawings. In the following description of these embodiments, the same designations and the same reference numerals are used for the same components, and further description thereof will be omitted.

As described in the Background Art above, it has been reported that a conventional beam homogenizer has two problems. Among these problems, one problem is that the air breakdown between the lens arrays $20a$ and $20b$ occurs, and another problem is that shock waves caused by plasma generated when the laser beam is irradiated onto the surface of the target (S) penetrate the target, and at the same time, electrons and ions scatter in response to the shock waves and deteriorate and damage the coating of the focusing lens $30$.

First, in order to reduce the risk of the air breakdown, the size of a beam which is focused should be large. To this end, the focal length should be lengthened or the equalization of the lens arrays $20a$ and $20b$ should be increased to reduce the pitch size of the lenslets. In this case, a problem arises in that the quality of the resulting image decreases.

Therefore, there is a need for a method capable of preventing the air breakdown phenomenon while reducing the focal length to increase the image quality.

To this end, the beam homogenizer of the present invention may comprise a plasma generation-preventing unit capable of preventing the air breakdown phenomenon while increasing the image quality. The plasma generation-preventing unit is disposed between a plurality of lens arrays $20a$ and $20b$ and configured to prevent plasma from being generated in the focal zone of beamlets, and may also be embodied in various forms. Hereinafter, embodiments of the present invention, which adopt the plasma generation-preventing unit, will be described in detail.

For convenience of explanation, in the following embodiments, the direction in which the laser irradiation unit is positioned is defined as forward, and the direction in which the target is positioned is defined as backward. However, it is to be understood that the scope of the present invention is not limited by the directions defined as described above.

Figure 5:
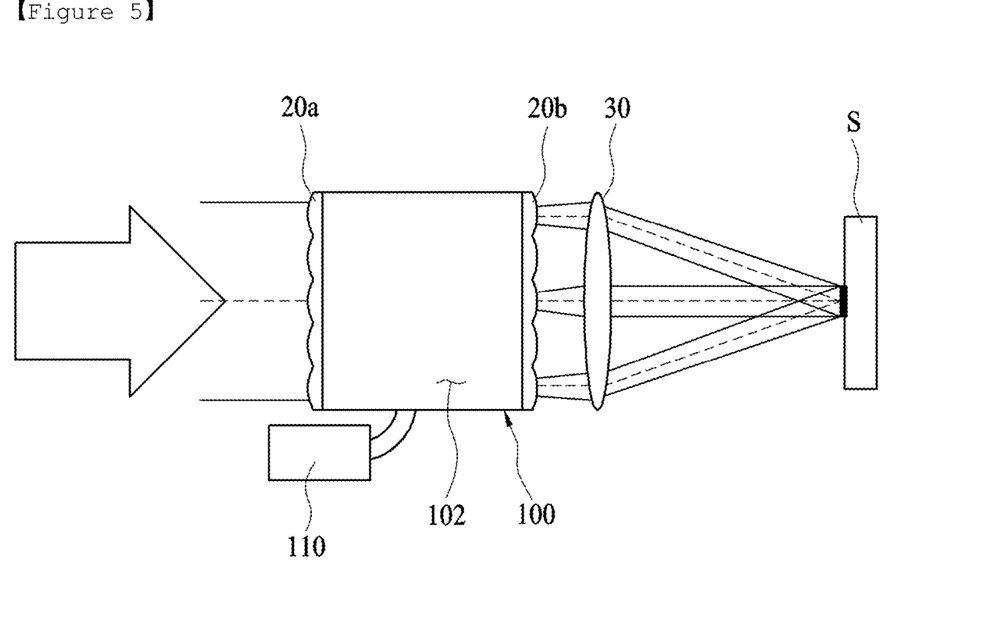
FIG. 5 shows each component of a beam homogenizer according to a first embodiment of the present invention.

FIG. 5 illustrates each component of a beam homogenizer according to a first embodiment of the present invention.

As shown in FIG. 5, the beam homogenizer according to the first embodiment of the present invention comprises a first lens array $20a$, a second lens array $20b$, a focusing lens $30$, and a plasma generation-preventing unit. In this regard, the plasma generation-preventing unit comprises a vacuum chamber $100$.

The first lens array $20a$ is configured to split a laser beam, irradiated from a laser beam irradiation unit, into a plurality of beamlets, and may comprise a plurality of lenslets configured to determine the shape of the laser beam. For example, the shape of the lenslets is rectangular, the shape of the resulting image is also rectangular.

The second lens array $20b$ is disposed to be spaced apart from the first lens array $10a$, and configured to direct the plurality of beamlets, split by the first lens array 20a, to the focusing lens 30. In addition, the second lens array 20b may comprise a plurality of lenslets corresponding to the first lens array 20a. Namely, the size and number of the lenslets provided in the second lens array 20b are equal to the size and number of the lenslets of the first lens array 20a.

The focusing lens 30 is configured to focus the plurality of beamlets, which passed through the second lens array 20b, onto the surface of a target (S), and the beamlets that passed through the focusing lens 30 can become uniform while they overlap on an image plane formed on the surface of the target (S).

The plasma generation-preventing unit is disposed between the first lens array 20a and the second lens array 20b and configured to prevent plasma from being generated in the focal zone of the beamlets.

In addition, in this embodiment, the plasma generation-preventing unit may comprise a vacuum chamber 100 disposed between the first lens array 20a and the second lens array 20b and having an internal space 102 which is maintained in a vacuum atmosphere.

Namely, the vacuum chamber 100 is disposed between the first lens array 20a and the second lens array 20b so as to surround the focal zone of the plurality of beamlets, and the internal space 102 thereof may be maintained in a vacuum atmosphere by a vacuum pump 110 or the like.

In this embodiment as described above, the internal space of the vacuum chamber 100 is maintained in a vacuum atmosphere, and thus air molecules in a region in which the beamlets are focused become rare, and the likelihood that the air molecules are converted into a plasma state due to the high output beam is reduced. Thus, this embodiment makes it possible to effectively prevent the air breakdown phenomenon.

Meanwhile, it is to be understood that the vacuum chamber 100 may be formed in various shapes other than that shown in this embodiment and that the vacuum atmosphere in the internal space may also be maintained by various methods.

Other configurations of the plasma generation-preventing unit will now be described.

Figure 6:
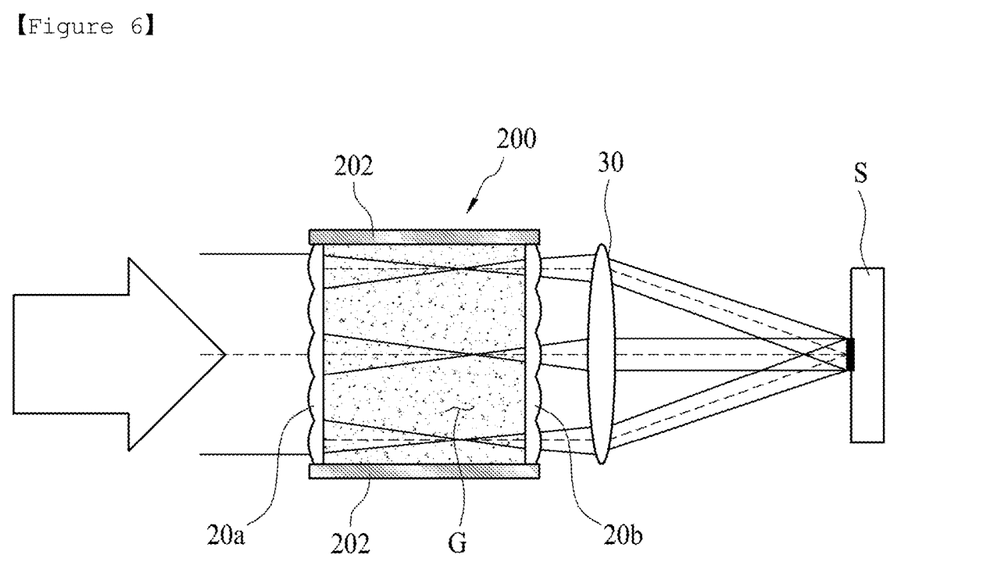
FIG. 6 shows each component of a beam homogenizer according to a second embodiment of the present invention.

FIG. 6 illustrates each component of a beam homogenizer according to a second embodiment of the present invention.

The second embodiment of the present invention as shown in FIG. 6 differs from the first embodiment in that the plasma generation-preventing unit comprises a gas chamber 200. The gas chamber 200 is formed to surround at least the focal zone of the beamlets, and receives a filling gas (G) having a plasma generation threshold higher than the plasma generation threshold of air.

Namely, in this embodiment, the specific filling gas (G) having a threshold higher than a threshold at which the air breakdown between the lens arrays 20a and 20b may occur is filled in the gas chamber 200, thereby preventing plasma from being generated. The filling gas (G) will be described in detail later.

In particular, in this embodiment, the gas chamber 200 comprises first frames 202 disposed on both sides of each of the first lens array 20a and the second lens array 20b and configured to cover the space between the first lens array 20a and the second lens array 20b.

Namely, the internal space is covered by the first frames 202, the first lens array 20a and the second lens array 20b, and thus the filling gas (G) may be supplied into the gas chamber 200.

Although not shown in the figure, the gas chamber 200 may comprise an inlet and an outlet, through which the filling gas may be introduced into and discharged from the gas chamber 200, for easy maintenance and repair.

Figure 7:
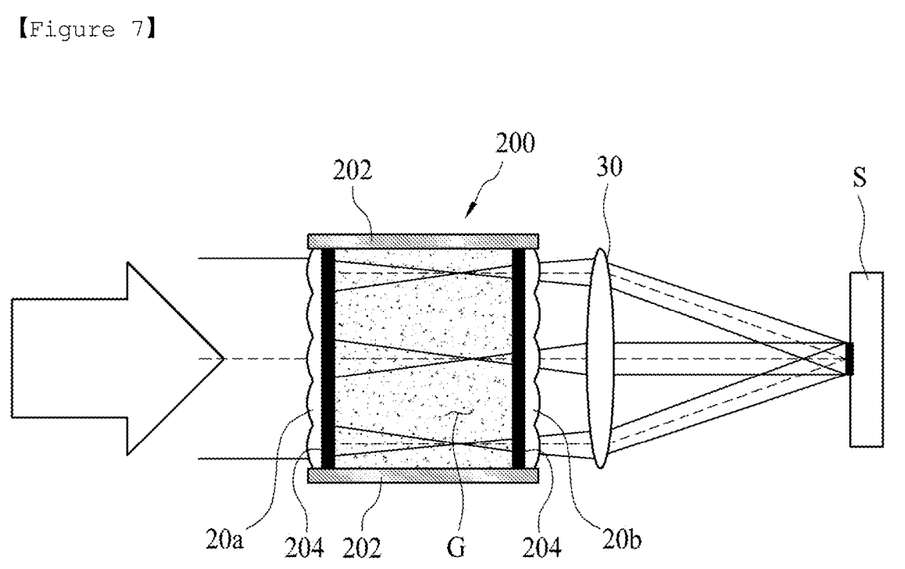
FIG. 7 shows each component of a beam homogenizer according to a third embodiment of the present invention.
Figure 8:
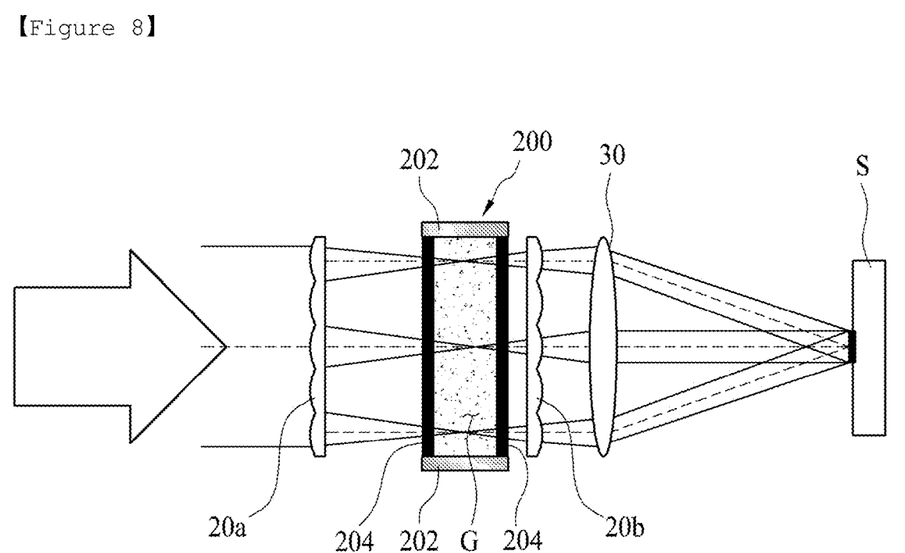
FIG. 8 shows each component of a beam homogenizer according to a fourth embodiment of the present invention.

FIG. 7 illustrates each component of a beam homogenizer according to a third embodiment of the present invention, and FIG. 8 illustrates each component of a beam homogenizer according to a fourth embodiment of the present invention.

The third embodiment shown in FIG. 7 is configured in substantially the same manner as the second embodiment described above. However, the third embodiment differs from the second embodiment in that the gas chamber 200 is disposed in a direction parallel to the first lens array 20a and the second lens array 20b and comprises, in addition to the first frames 202, second frames 204 configured to cover the space between the first lens array 20a and the second lens array 20b.

In particular, the second frames 204 are configured to transmit a beam such that a laser beam can easily move.

The fourth embodiment shown in FIG. 8 is configured such that the gas chamber 200 comprises the first framers 202 and the second frames 204, like the third embodiment. However, this embodiment differs from the third embodiment in that the first frames 202 and the second frames 204 are configured to cover only the focal zone of the plurality of beamlets.

In this case, there are advantages in that the gas chamber 200 can be miniaturized and the amount of filling gas (g) supplied can be minimized.

The gas chamber 200 may be configured in various manners as described above. Hereinafter, a filling gas (G) that may be applied to each of the embodiments will be described.

Figure 9:
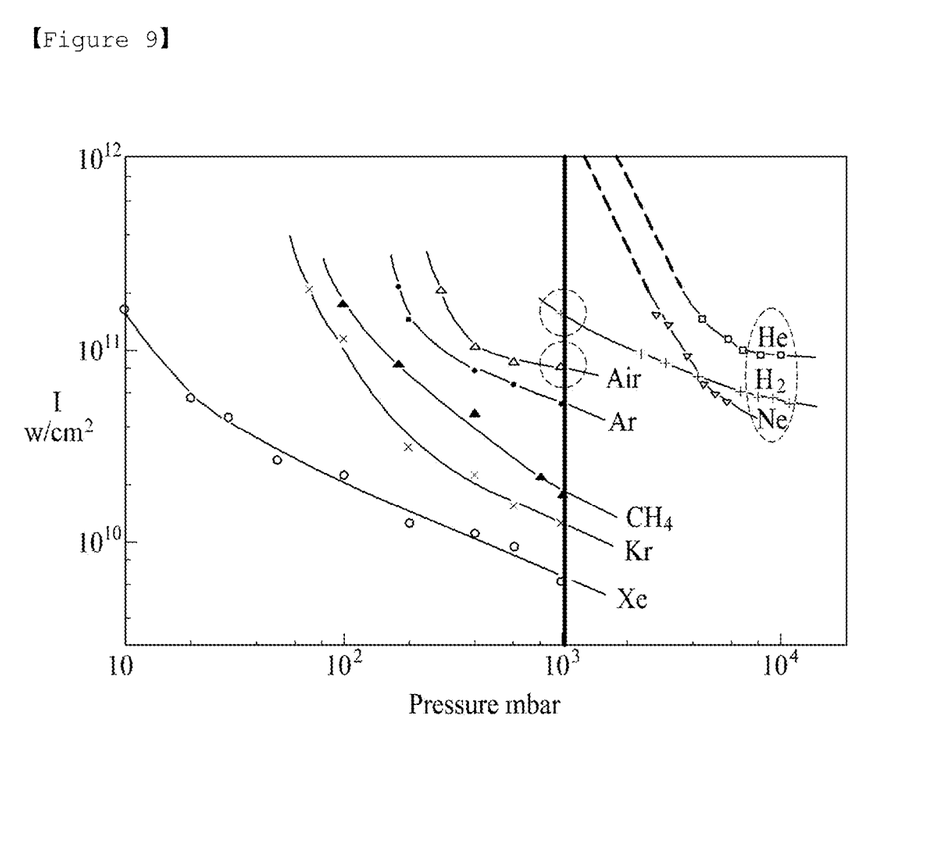
FIG. 9 is a graph showing data obtained by performing a breakdown test in various gases, including air.

FIG. 9 is a graph showing data obtained by performing a breakdown test in various gases, including air. In particular, in this test, a KrF laser oscillating at 248 nm was used.

As shown in the graph, when the breakdown threshold of each gas at 1 atm (=about 1000 mbar) is examined, it can be seen that the breakdown thresholds of hydrogen, helium and neon are higher than that of air. In particular, from the overall trend of the graph, it can be seen that the breakdown thresholds of helium and neon are significantly higher than that of air at 1 atm. As the breakdown threshold between the lens arrays 20a and 20b increases, the breakdown phenomenon will not occur even at high laser irradiation intensities. Thus, as a filling gas (G) that may be applied to each of the embodiments, helium or neon may be applied, except for hydrogen whose breakdown threshold does not significantly differ from that of air and which has a risk of explosion.

As described above, the present invention has an advantage in that it can increase the image quality while preventing the breakdown phenomenon by the plasma generation-preventing units configured in various manners.

Hereinafter, description will be made of a method for preventing the phenomenon in which shock waves caused by plasma generated when a laser beam is irradiated onto the surface of the target (S) penetrates the target (S) and, at the same time, electrons and ions scatter in response to the shock waves and deteriorate or damage the coating of the focusing lens 30.

Figure 10:
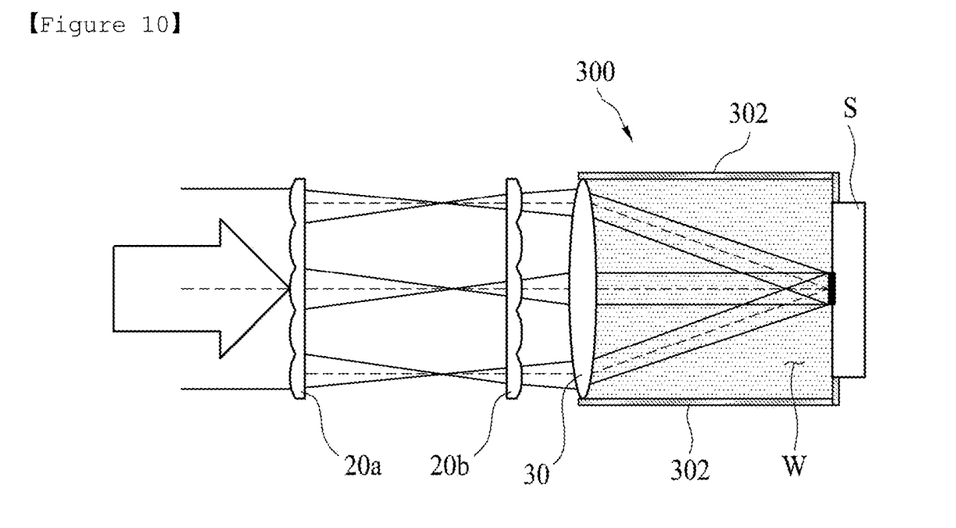
FIG. 10 shows each component of a beam homogenizer according to a fifth embodiment of the present invention.

FIG. 10 illustrates each component of a beam homogenizer according to a fifth embodiment of the present invention.

As shown in FIG. 10, the beam homogenizer of the present invention comprises a damage-preventing unit 300 disposed between the focusing lens 30 and the target (S) and configured to prevent the focusing lens 30 from being damaged by energy generated in a process in which the plurality of beamlets is irradiated onto the target.

In addition, the damage-preventing unit may comprise a housing 302 disposed in the irradiation path of the beamlets and having formed therein a receiving space that receives water (W).

When water (W) is filled between the focusing lens 30 and the target (S), the water (W) may act as an inertial tampering layer that quenches heat generated by the laser beam and reduces the internal stress of the target (S). Namely, the water (W) can temporarily trap plasma that may be generated during laser surface modification, thereby helping to pressurize the surface of the target S and preventing the focusing lens 30 from being damaged by electrons, ions and pieces and from the image quality from decreasing.

In this embodiment, the housing 302 is configured to cover the entire region between the target (S) and the focusing lens 30, and thus can cover the entire movement path of the laser beam.

Figure 11:
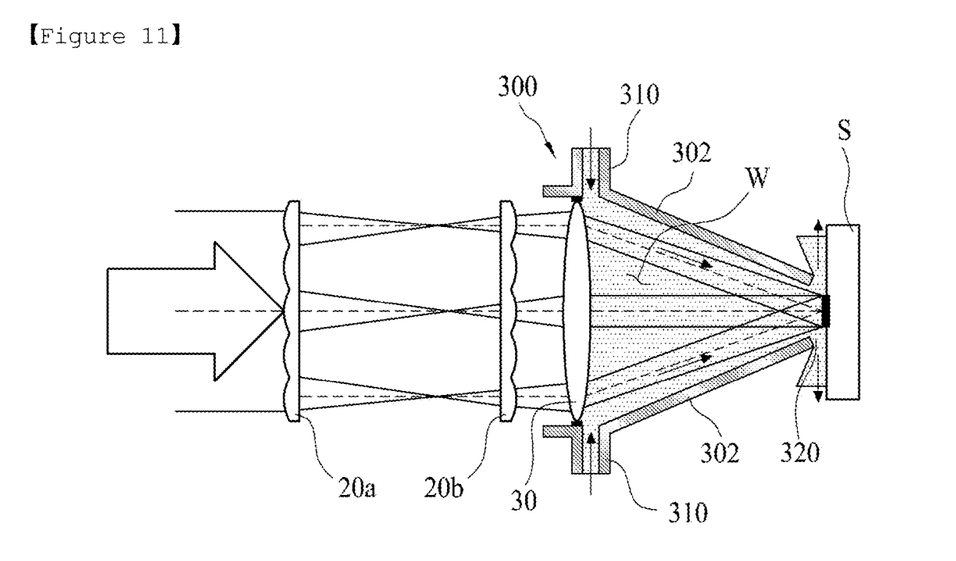
FIG. 11 shows each component of a beam homogenizer according to a sixth embodiment of the present invention.

FIG. 11 illustrates each component of a beam homogenizer according to a sixth embodiment of the present invention.

The beam homogenizer shown in FIG. 11 is configured such that the damage-preventing unit 300 comprises the housing 302 that receives water (W), like the fifth embodiment. However, this embodiment differs in that the shape of the housing 302 is configured such that the water (W) flows in one direction.

Specifically, in this embodiment, the housing 302 is formed to be inclined such that the sectional area thereof decreases gradually from the focusing lens 30 toward the target (S). At the front end of the housing, an inlet 310 configured to introduce water into the receiving space is formed, and at the rear end, an outlet 320 configured to discharge water from the receiving space is formed.

Accordingly, the water (W) in the receiving space can flow from the inlet 310 toward the outlet 320. In particular, in this embodiment, the inlet 310 is formed around the front end of the housing 302 such that the water (W) is introduced laterally, and the outlet 320 is formed around the rear end of the housing 302 such that the water (W) is discharged laterally through the space between the housing 302 and the target (S).

Figure 12:
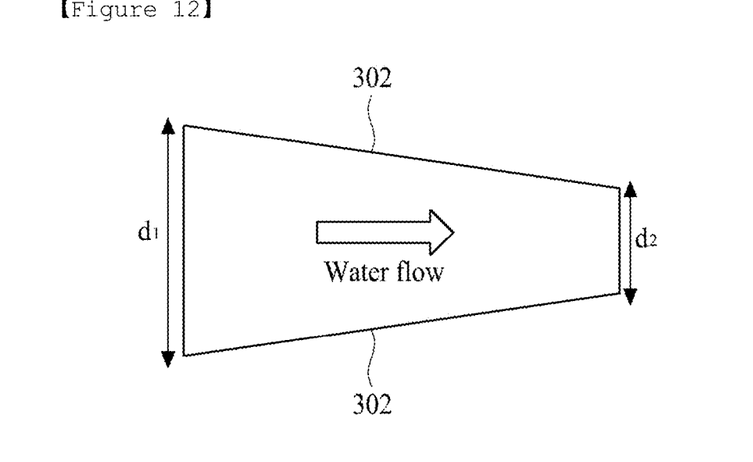
FIG. 12 shows the dimensions of a housing as a function of flow velocity in a beam homogenizer according to a sixth embodiment of the present invention.

Here, the housing 302 may have a circular section. As shown in FIG. 12, the specific dimensions of the housing 302, that is, the diameter (d1) of the front end and the diameter (d2) of the rear end of the housing 302, may be determined within a range in which the water in the receiving space forms laminar flow.

This ensures that the flow of the water (W) in the receiving space is made uniform and the beamlets are also irradiated uniformly, thereby increasing the image quality. To this end, the diameter (d1) of the front end and the diameter (d2) of the rear end of the housing 302 can be determined using Reynolds number.

The Reynolds number is a dimensionless number that distinguishes between laminar flow and turbulent flow. As shown in Table below, when the Reynolds number is below 2300, it can be determined that the Reynolds number corresponds to laminar flow.

| Re < 2300 | Laminar flow |
| 2300 < Re < 4000 | Transition flow |
| 4000 < Re | Turbulent flow |

In addition, the Reynolds number can be calculated by the following equation:

$$Re = \frac{\rho V D}{\mu} = \frac{VD}{v}$$

| V | Velocity | m/s |
| D | Characteristic length | m |
| $\mu$ | Dynamic viscosity | Kg/(ms) |
| $v$ | Kinematic viscosity | m²/s |
| $\rho$ | Density | kg/m² |

Meanwhile, according to the mass-conservation equation, the equation A1V1=A2V2 (A: sectional area; V: flow velocity) is applied. Thus, when the equation is rearranged and substituted into the mass-conservation equation, the diameter (d2) of the rear end of the housing 302, which corresponds to the diameter (d1) of the front end of the housing 302, can be calculated by the following procedure. The following procedure is an example in which the diameter (d1) of the front end of the housing 302 is set at 3 cm.

$$D_1 = 3 \text{ cm}$$

$$V_{1,max} = \frac{Re_{max} \times v_{25° C.}}{D_1} \approx \frac{2300 \times 0.9 \times 10^{-6} [m^2/s]}{0.03 [m]} = 6.9 \text{ [cm/s]}$$

$$V_2 = \frac{A_1 V_1}{A_2}$$

$$Re_2 = \frac{V_2 D_2}{v} < 2300$$

In addition, the diameter (d2) of the rear end of the housing 302, calculated as a function of the flow velocity of water (W) by the above procedure, is as follows.

| | V₁ [cm/s] | | | | | |
| --- | --- | --- | --- | --- | --- | --- |
| | 1 | 2 | 3 | 4 | 5 | 6 |
| $D_{2,min}$ [cm] | 0.45 | 0.9 | 1.4 | 1.8 | 2.4 | 2.7 |

That is, assuming that the diameter (d1) of the front end of the housing 302 is 3 cm, the flow velocity (V2) at the rear end of the housing 302, at which the outlet is formed, changes as the velocity of water (W) at the front end of the housing 302 is increased from 1 to 6 cm/s. In this manner, the minimum diameter (d2) of the rear end of the housing 302, which corresponds to a Reynolds number of 2300 or less, can be calculated.

In conclusion, the dimensions of the housing 302 in this embodiment can be determined within a range in which the water in the receiving space forms laminar flow.

As described above, the present invention makes it possible to effectively prevent the coating of the focusing lens 30 from being deteriorated or damaged due to shock waves caused by plasma generated when the laser beam is irradiated onto the surface of the target (S).

Although the exemplary embodiments of the present invention have been described above, it will be obvious to those skilled in the art that the present invention may be embodied in other specific forms without departing from the spirit or scope of the present invention. Therefore, it should

What is claimed is:

1. A beam homogenizer for surface modification, comprising:
   a first lens array configured to split a laser beam, irradiated from a laser beam irradiation unit, into a plurality of beamlets, the first lens array comprising a plurality of lenslets configured to determine a shape of the laser beam;
   a second lens array configured to transmit the plurality of beamlets split by the first lens array, the second lens array comprising a plurality of lenslets corresponding to the first lens array;
   a focusing lens configured to focus the plurality of beamlets, transmitted through the second lens array, onto a surface of a target; and
   a plasma generation-preventing unit disposed between the first lens array and the second lens array and configured to prevent plasma from being generated in a focal zone of the beamlets.

2. The beam homogenizer of claim 1, wherein the plasma generation-preventing unit comprises a vacuum chamber disposed between the first lens array and the second lens array and having an internal space which is maintained in a vacuum atmosphere.

3. The beam homogenizer of claim 1, wherein the plasma generation-preventing unit comprises a gas chamber formed to cover at least the focal zone of the beamlets and configured to receive a filling gas having a plasma generation threshold higher than that of air.

4. The beam homogenizer of claim 3, wherein the gas chamber comprises first frames disposed on both sides of each of the first lens array and the second lens array and configured to cover a space between the first lens array and the second lens array.

5. The beam homogenizer of claim 4, wherein the gas chamber further comprise second frames disposed in a direction parallel to the first lens array and the second lens array and configured to cover the space between the first lens array and the second lens array together with the first frames and also capable of transmitting the beam.

6. The beam homogenizer of claim 3, wherein the filling gas comprises at least one of helium and neon.

* * * * *